US010911132B2

(12) United States Patent
Alminde et al.

(10) Patent No.: US 10,911,132 B2
(45) Date of Patent: Feb. 2, 2021

(54) LOW EARTH ORBIT SATELLITE FOR AIR TRAFFIC CONTROL

(71) Applicant: GOMSPACE A/S, Aalborg Ø (DK)

(72) Inventors: Lars Krogh Alminde, Arden (DK); Jacob Mølbach Nissen, Storvorde (DK)

(73) Assignee: GOMSPACE A/S, Aalborg Ø (DK)

( * ) Notice: Subject to any disclaimer, the term of this patent is extended or adjusted under 35 U.S.C. 154(b) by 246 days.

(21) Appl. No.: 15/743,701

(22) PCT Filed: Jul. 12, 2016

(86) PCT No.: PCT/EP2016/066519
§ 371 (c)(1),
(2) Date: Jan. 11, 2018

(87) PCT Pub. No.: WO2017/009329
PCT Pub. Date: Jan. 19, 2017

(65) Prior Publication Data
US 2018/0227041 A1  Aug. 9, 2018

(30) Foreign Application Priority Data

Jul. 16, 2015  (DK) .................................. 2015 00417

(51) Int. Cl.
H04B 7/185  (2006.01)
H04B 7/195  (2006.01)
(Continued)

(52) U.S. Cl.
CPC ........ *H04B 7/18508* (2013.01); *G01S 5/0009* (2013.01); *G08G 5/0013* (2013.01);
(Continued)

(58) Field of Classification Search
CPC ............ H04B 7/18508; H04B 7/18515; H04B 7/1851; H04B 7/195; G08G 5/0095;
(Continued)

(56) References Cited

U.S. PATENT DOCUMENTS 5,570,095 A * 10/1996 Drouilhet, Jr. et al. .. G01S 5/15
342/456
5,963,846 A    10/1999 Kurby
(Continued)

FOREIGN PATENT DOCUMENTS

EP    1 041 741    10/2000
WO    01/89114    11/2001
(Continued)

OTHER PUBLICATIONS

Handbook on Radio Frequency Spectrum Requirements for Civil Aviation, vol. II, Frequency planning criteria for aeronautical radio communication and navigation systems, First Edition, International Civil Aviation Organization, 2013, Doc 9718 An/957, ISBN 978-92-9249-229-8, 75 pages (Year: 2013).*
(Continued)

*Primary Examiner* — Dale W Hilgendorf
(74) *Attorney, Agent, or Firm* — Clark & Brody LP

(57) ABSTRACT

The present invention relates to low earth orbit satellites for air traffic control. One or more LEO satellites serves as a link between a control tower and an aircraft. The one or more LEO satellites are adapted for a) receiving an Automatic Dependent Surveillance-Broadcast, ADS-B, signal from an aircraft; b) receiving and/or transmitting a signal from/to a control tower; and c) receiving and/or transmitting a VHF signal from/to an aircraft.

17 Claims, 2 Drawing Sheets

(51) Int. Cl.
*G08G 5/00* (2006.01)
*G01S 5/00* (2006.01)
*H04W 84/06* (2009.01)

(52) U.S. Cl.
CPC ......... *G08G 5/0082* (2013.01); *G08G 5/0095* (2013.01); *H04B 7/1851* (2013.01); *H04B 7/18515* (2013.01); *H04B 7/195* (2013.01); *G01S 2205/003* (2013.01); *H04W 84/06* (2013.01)

(58) Field of Classification Search
CPC .. G08G 5/0013; G08G 5/0082; G01S 5/0009; G01S 2205/003; H04W 84/06
See application file for complete search history.

(56) References Cited

U.S. PATENT DOCUMENTS

| | | | | |
|---|---|---|---|---|
| 6,044,323 | A * | 3/2000 | Yee et al. ............ | G08G 5/0013 701/120 |
| 9,221,553 | B1 * | 12/2015 | Mitchell ............ | H04B 7/18508 |
| 9,819,410 | B1 * | 11/2017 | Azevedo et al. .. | H04B 7/18508 |
| 10,030,995 | B2 * | 7/2018 | Adler et al. ......... | G08G 5/0013 |
| 2011/0015852 | A1 * | 1/2011 | Blomenhofer et al. ..................... H04B 7/18508 701/120 |
| 2011/1015852 | | 1/2011 | Blomenhofer et al. | |
| 2011/0189943 | A1 * | 8/2011 | Ilarregui et al. ... | H04B 7/18508 455/7 |
| 2014/0002293 | A1 * | 1/2014 | Behrens et al. ..... | G08G 5/0013 342/36 |
| 2014/0218242 | A1 | 8/2014 | Platzer | |
| 2016/0275801 | A1 * | 9/2016 | Kopardekar ......... | G08G 5/0082 |

FOREIGN PATENT DOCUMENTS

| | | | |
|---|---|---|---|
| WO | WO0189114 A2 * | 11/2001 | ......... H04B 7/18508 |
| WO | 2008/065658 | 6/2008 | |

OTHER PUBLICATIONS

"Aircraft", The Radio Reference Wiki, RadioReference.com LLC, 2018.

* cited by examiner

LOW EARTH ORBIT SATELLITE FOR AIR TRAFFIC CONTROL

TECHNICAL FIELD OF THE INVENTION

The present invention relates to low earth orbit satellites for air traffic control.

BACKGROUND OF THE INVENTION

Air traffic control involves human staff communicating with the pilots of a plurality of planes, instructing them on flight profiles (consisting of altitudes and azimuthal routes) so as to avoid collisions. Aircrafts generally file "flight plans" indicating their routes before take-off; and from these, the controllers have some initial information on the likely positions and trajectories of aircraft. However, flight plans are inherently subject to variation (e.g. due to delays in take-offs; changes of speed due to head wind or tails wind; and permitted modifications of the course or altitude by the pilot). In busy sectors (typically, those close to airports), significant tactical control of the aircraft by the controllers is necessary.

The controllers are supplied with data on the position and altitude of the aircraft from primary and secondary radar units, such as terrestrial ADS-B receiver stations, and ask the pilots for information such as altitude, heading and speed. They instruct the pilots by radio to maintain their headings and speeds, alter their headings and speeds in a predetermined fashion, or maintain or alter their altitudes (e.g. to climb to a certain altitude or to descend to a certain altitude) to maintain safe minimum separation between aircrafts and, thus, to avoid the risk of collisions.

In order to optimize the air traffic control in busy sectors, it would be an advantage to obtain contact with an aircraft in due time before the aircraft reaches the sector. However, the control tower is limited by the range of their radio, as well as by limited exact knowledge about how close the aircraft is from being within radio contact.

It is therefore desirable to provide a system for air traffic control, which can overcome some of these issues.

SUMMARY OF THE INVENTION

The inventors of the present invention has provided a system capable of optimizing air traffic control in busy sectors. The system is capable of obtaining contact with an aircraft in due time before the aircraft reaches the sector.

A first aspect of the present invention relates to the use of a low earth orbit, LEO, satellite for air traffic control; wherein the LEO satellite is adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction;
wherein the LEO satellite is further adapted for receiving a signal from a control tower, and to re-transmit said signal to an aircraft on a compensated VHF frequency for compensating for Doppler frequency shifts, and wherein the compensation is based on the information from the aircraft's ADS-B signal.

A first aspect of the present invention relates to the use of a low earth orbit, LEO, satellite for air traffic control; wherein the LEO satellite is adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction.

The signal received/transmitted from/to a control tower may e.g. be via the L-, S-, C-, and/or E-band.

Today, aircrafts are tracked with primary (PSR) and secondary (SSR) surface radars. Recently, with Automatic Dependent Surveillance-Broadcast (ADS-B) it has become possible to track air transport aircraft also with ADS-B ground stations complementary to radars. The ADS-B signals are not directed to a specific receiver but rather can be received by any receiver within reach of the broadcast transmitter and technically capable of receiving the signals.

The principle of ADS-B is the automatic, periodic and unaddressed broadcast of existing on-board data by each aircraft equipped with appropriate transmitters. Data to be broadcast can be, e.g. position, altitude, speed vector, intent, and/or call sign of the aircraft, or the aircraft class, etc. The data broadcast is mostly performed at the aviation frequency of 1090 MHz. The broadcast data can be received at ADS-B ground stations, which monitor this frequency and extract the Mode-S 1090 MHz. An alternative technology for broadcast of ADS-B signal is the Universal Access Transceiver operating at 978 MHz.

However, many oceanic and African Flight Information Regions (FIRs) are not reachable by terrestrial systems. Therefore, the inventors have proposed to use satellites to access the ADS-B signal from the aircraft present in the airspace. Using satellites solves the problem in areas without radar coverage or in areas without coverage provided by terrestrial ADS-B receiving stations.

The satellite is a low earth orbit satellite. A higher orbit would result in a weaker signal making the technical implementation more challenging.

The satellite is constructed to be the link between a control tower and the aircraft. Preferably, it should be capable of providing means for two-way communication.

In one or more embodiments, the LEO satellite is adapted for:
  receiving and transmitting a signal from/to a control tower; and/or
  receiving and transmitting a VHF signal from/to an aircraft.

Using satellites in closer orbits (LEO satellites) achieve significantly higher ground level signal strengths. By steering the antenna beam to cover different geographical areas in a repetitive pattern a wide area coverage is achieved. However, these lower orbits necessarily result in significant relative velocities between a control tower/an aircraft and the satellite, resulting in a variable Doppler frequency shift, which derogate receiver sensitivity making signal acquisition extremely difficult. Hence, the inventors have developed a satellite that compensate for the Doppler frequency shifts.

In one or more embodiments, the LEO satellite is further adapted for receiving a signal from a control tower, and to re-transmit said signal to an aircraft on a compensated VHF frequency for compensating for Doppler frequency shifts, and wherein the compensation is based on the information from the aircraft's ADS-B signal.3

Another issue with using satellites as a link between the control tower and the aircraft is that the signal from the satellite may interfere with other frequencies that are used in the area.

In one or more embodiments, the LEO satellite is further adapted for receiving a signal from a control tower, and to re-transmit said signal to an aircraft at a narrow transmission bandwidth of 8.33 kHz in regions where aviation VHF channels are operated with nominally 25 kHz separation. This will minimize the interference of the signal.

In one or more embodiments, the region is identified by the information from the aircraft's ADS-B signal.

In one or more embodiments, the LEO satellite is further adapted for:

detecting a VHF signal from an aircraft;
correcting for Doppler frequency shifts; and
re-transmitting said VHF signal to a control tower.

In one or more embodiments, the LEO satellite is further adapted for re-transmitting the ADS-B signal and/or the VHF signal from an aircraft to another LEO satellite in a position closer to a control tower.

In one or more embodiments, the LEO satellite is further adapted for re-transmitting the signal from a control tower to another LEO satellite in a position closer to an aircraft.

In various alternate arrangements and preferred embodiments, data transmission between individual satellites is performed for data qualifying parsing, assembling and/or distributed processing.

In one or more embodiments, the extracted information from the ADS-B signal is converted into an Air Traffic Control (ATC) standard protocol by the satellite, and forwarded to a ground station (ATC or other users).

A third aspect relates to a system for air traffic control comprising:

one or more LEO satellites adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction;
one or more control towers adapted for receiving and/or transmitting a signal from/to a LEO satellite;
wherein the LEO satellite is further adapted for receiving a signal from a control tower, and to re-transmit said signal to an aircraft on a compensated VHF frequency for compensating for Doppler frequency shifts, and wherein the compensation is based on the information from the aircraft's ADS-B signal.

A fourth aspect relates to a system for air traffic control comprising:

one or more LEO satellites adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction one or more control towers adapted for receiving and/or transmitting a signal from/to a LEO satellite.

In one or more embodiments, the system and/or control tower is further adapted for receiving an ADS-B signal from a LEO satellite.

In various alternate arrangements and preferred embodiments, the system comprises multiple satellites, where data transmission is performed between individual satellites for data qualifying parsing, assembling and/or distributed processing.

A fifth aspect relates to a LEO satellite for air traffic control, the LEO satellite being adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction;
wherein the LEO satellite is further adapted for receiving a signal from a control tower, and to re-transmit said signal to an aircraft on a compensated VHF frequency for compensating for Doppler frequency shifts, and wherein the compensation is based on the information from the aircraft's ADS-B signal.

A sixth aspect relates to a LEO satellite for air traffic control, the LEO satellite being adapted for:
a) receiving an Automatic Dependent Surveillance-Broadcast, ADS-B, signal from an aircraft;
b) receiving and/or transmitting a signal from/to a control tower;
c) receiving and/or transmitting a VHF signal from/to an aircraft;
wherein the ADS-B signal emitted by the aircraft comprises information regarding the aircraft's position, speed, and direction.

In one or more embodiments, the LEO satellite is further adapted for re-transmitting the ADS-B signal to the control tower.

In one or more embodiments, the satellite further comprises means adapted for rebroadcasting the received ADS-B signal to other satellites or to an aircraft as an Automatic Dependent Surveillance-Rebroadcast, ADS-R.

A seventh aspect relates to a LEO satellite for air traffic control, the LEO satellite comprising:
a) means for receiving an Automatic Dependent Surveillance-Broadcast, ADS-B, signal from an aircraft;
b) means for receiving and/or transmitting a signal from/to a control tower;
c) means for receiving and/or transmitting a VHF signal from/to an aircraft;
wherein the ADS-B signal emitted by the aircraft comprises information regarding the aircraft's position, speed, and direction.

In one or more embodiments, the means for transmitting a VHF signal to an aircraft is configured for transmitting on a compensated VHF frequency for compensating for Doppler frequency shifts, and wherein the compensation is based on the information from the aircraft's ADS-B signal.

In one or more embodiments, the means for transmitting a VHF signal to an aircraft is configured for transmitting a signal to an aircraft at a narrow transmission bandwidth of 8.33 kHz in regions where aviation VHF channels are operated with nominally 25 kHz separation. This will minimize the interference of the signal.

It should be noted that embodiments and features described in the context of one of the aspects of the present invention also apply to the other aspects of the invention.

DETAILED DESCRIPTION OF THE INVENTION

The general aspects of the invention are described in the following as a solution to optimize air traffic control in busy sectors. The system is capable of obtaining contact with an aircraft in due time before the aircraft reaches the sector.

Figure 1:
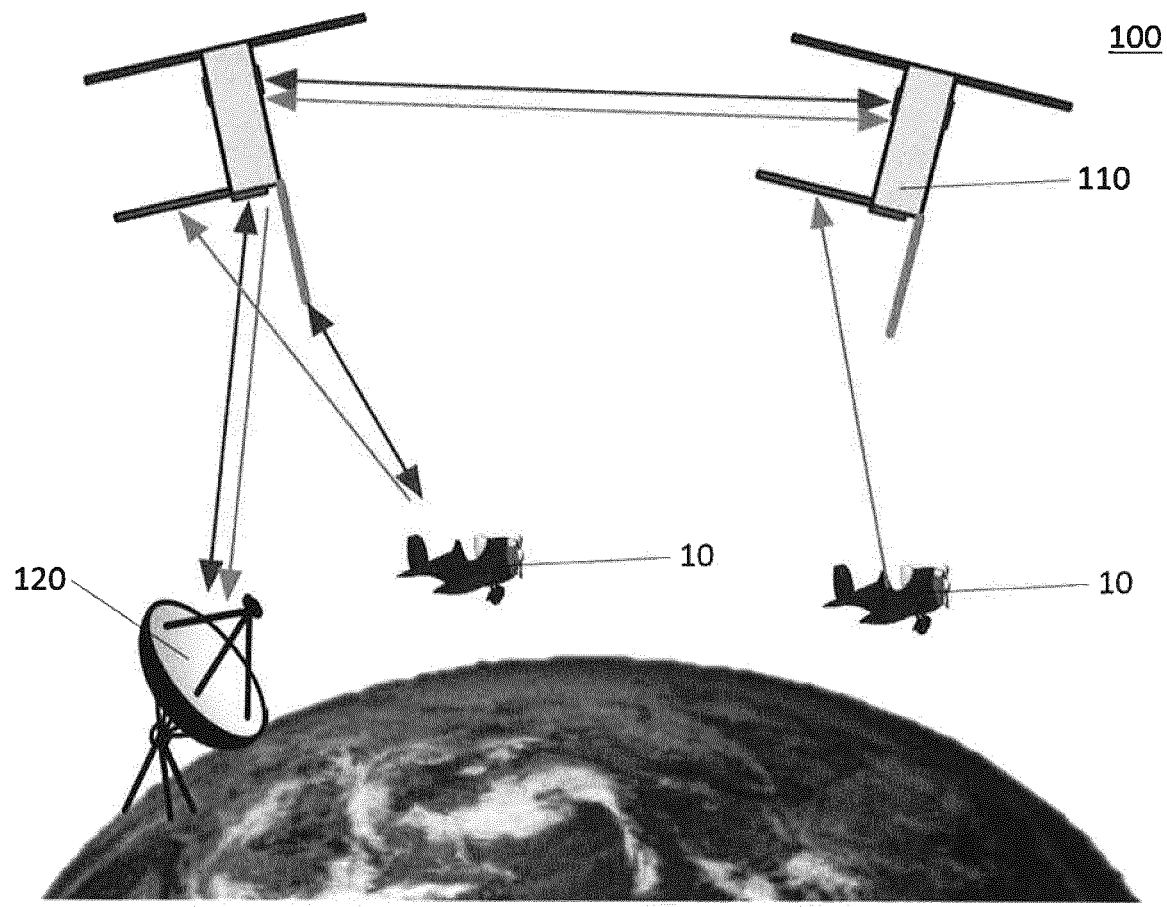
FIG. 1 shows a system for air traffic control in accordance with various embodiments of the invention.

A schematic view of a system 100 for air traffic control in accordance with various embodiments of the invention is shown in FIG. 1. The system comprises one or more satellites 110 and a control tower 120.

The one or more LEO satellites 110 are adapted for receiving an Automatic Dependent Surveillance-Broadcast, ADS-B, signal from an aircraft. The ADS-B signal emitted by the aircraft comprises information regarding the aircrafts position, speed, and direction. This information may be relayed directly to the control tower 120, or may be relayed to another LEO satellite, and then to the control tower 120. This information is important for the control tower 120 for them to plan the flight profiles for the aircraft that is about to enter a given sector.

The pilot needs to be informed about any changes in his flight plan. Thus, in order to inform the pilot in good time, the LEO satellites 110 are also adapted for receiving and/or transmitting a signal from/to a control tower; as well as adapted for receiving and/or transmitting a VHF signal from/to an aircraft.

The one or more control towers 120 should also be adapted for receiving and/or transmitting a signal from/to a LEO satellite 110.

Figure 2:
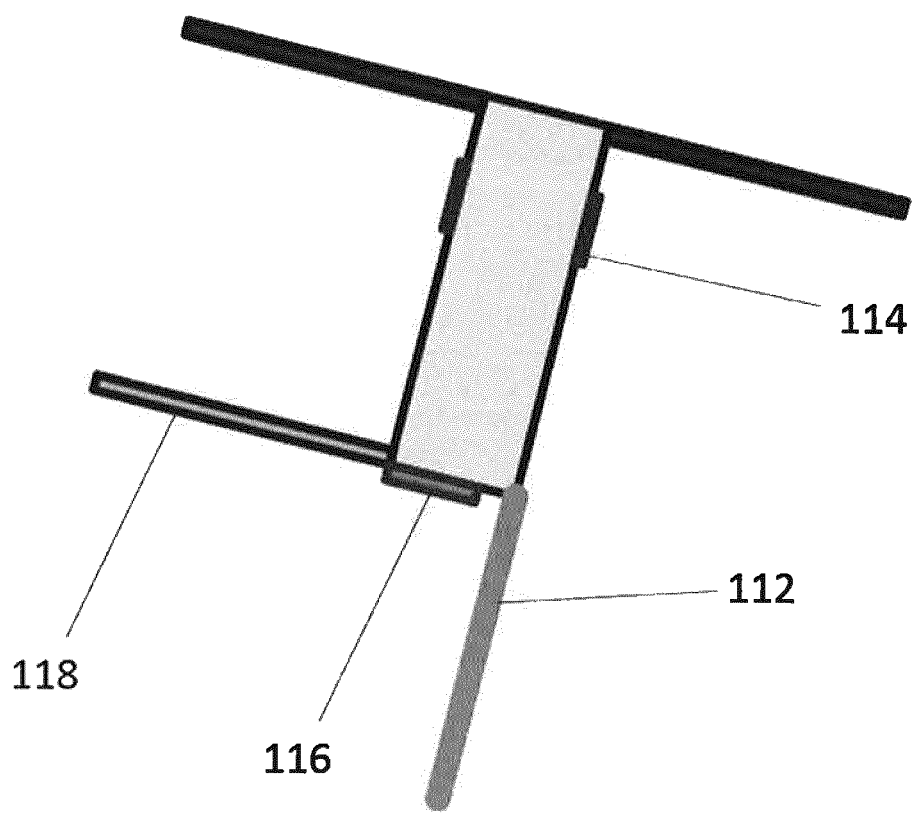
FIG. 2 shows a LEO satellite for air traffic control in accordance with various embodiments of the invention.

In FIG. 2, a LEO satellite for air traffic control is shown.

The LEO satellite 110 comprises:
a) means 118 for receiving an Automatic Dependent Surveillance-Broadcast, ADS-B, signal from an aircraft 10;
b) means 116 for receiving and/or transmitting a signal from/to a control tower 120; and
c) means 112 for receiving and/or transmitting a VHF signal from/to an aircraft.

The LEO satellite 110 is also shown comprising means 114 for receiving and/or transmitting a signal from/to another LEO satellite.

The means 112 for transmitting a VHF signal to an aircraft is configured for transmitting on a compensated VHF frequency for compensating for Doppler frequency shifts, and wherein the compensation is based on the information from the aircrafts ADS-B signal.

The means 112 for transmitting a VHF signal to an aircraft is also configured for transmitting a signal to an aircraft at a narrow transmission bandwidth of 8.33 kHz in regions where aviation VHF channels are operated with nominally 25 kHz separation. This will minimize the interference of the signal.

REFERENCES

10 Aircraft
100 System
110 LEO satellite
112 Means for receiving and/or transmitting a VHF signal from/to an aircraft
114 Means for receiving and/or transmitting a signal from/to another LEO satellite
116 Means for receiving and/or transmitting a signal from/to a control tower
118 Means for receiving an ADS-B signal from an aircraft
120 Control tower

The invention claimed is:

1. A method for using a low earth orbit, LEO, satellite for air traffic control, wherein human communication occurs between an air traffic controller in a control tower and a pilot of an aircraft, comprising the steps of:
 a) receiving, with the LEO satellite, an Automatic Dependent Surveillance-Broadcast, ADS-B, signal from the aircraft; wherein the ADS-B signal emitted by the aircraft comprises information regarding the aircraft's position, speed, and direction;
 b) relaying, with the LEO satellite, said information to the control tower;
 c) receiving, with the LEO satellite, a signal from the control tower; and
 d) retransmitting said signal, with the LEO satellite, to the aircraft on a compensated VHF frequency for compensating for Doppler frequency shifts, and wherein the compensation is based on the information from the aircraft's ADS-B signal,
  wherein the signal from step (c) and the retransmitted signal from step (d) on the compensated VHF frequency includes human communication from the air traffic controller to the pilot, the human communication relating to maintaining or changing one or more of speed, altitude, heading, and separation, the use of the LEO satellite allowing the human communication between the air traffic controller and pilot before the aircraft would reach a sector where radio contact between the control tower and the pilot is available.

2. The method according to claim 1, wherein the LEO satellite in step d) retransmits the signal to the aircraft at a narrow transmission bandwidth of 8.33 kHz in one or more regions where aviation VHF channels are operated with nominally 25 kHz separation.

3. The method according to claim 2, wherein the one or more regions are identified by the information from the aircraft's ADS-B signal.

4. The method according to claim 1, wherein the LEO satellite retransmits the ADS-B signal and/or a VHF signal from the aircraft to another LEO satellite in a position closer to the control tower.

5. The method according to claim 1, wherein the LEO satellite retransmits the signal from the control tower to another LEO satellite in a position closer to the aircraft.

6. A system (100) for air traffic control, wherein human communication occurs between an air traffic controller in a control tower and a pilot of an aircraft, comprising:
 one or more low earth orbit, LEO, satellites (110) adapted for:
 a) receiving an Automatic Dependent Surveillance-Broadcast, ADS-B, signal from the aircraft (10);
 b) receiving and/or transmitting a signal from/to one or more control towers (120);
 c) receiving and/or transmitting a VHF signal from/to the aircraft (10);

wherein the ADS-B signal emitted by the aircraft (10) comprises information regarding the aircraft's position, speed, and direction;

the one or more control towers (300) adapted for receiving and/or transmitting the signal from/to the one or more LEO satellites;

wherein the one or more LEO satellites are further adapted for receiving the signal from the one or more control towers, and to re-transmit said signal to the aircraft on a compensated VHF frequency for compensating for Doppler frequency shifts, and wherein the compensation is based on the information from the aircraft's ADS-B signal, and further wherein the signal received by the one or more LEO satellites from the one or more control towers and the signal re-transmitted from the one or more LEO satellites to the aircraft on the compensated VHF frequency includes human communication from the air traffic controller to the pilot, the human communication relating to maintaining or changing one or more of speed, altitude, heading, and separation, the use of the LEO satellite allowing the human communication between the air traffic controller and pilot before the aircraft would reach a sector where radio contact between the control tower and the pilot is available.

7. The system for air traffic control according to claim 6, wherein the one or more LEO satellites are further adapted for receiving the signal from the one or more control towers, and to re-transmit the signal to the aircraft at a narrow transmission bandwidth of 8.33 kHz in one or more regions where aviation VHF channels are operated with nominally 25 kHz separation.

8. The system for air traffic control according to claim 7, wherein the one or more regions are identified by the information from the aircraft's ADS-B signal.

9. The system for air traffic control according to claim 6, wherein the one or more LEO satellites are further adapted for re-transmitting the ADS-B signal and/or the VHF signal from the aircraft to another LEO satellite in a position closer to the one or more control towers.

10. The system for air traffic control according to claim 6, wherein the one or more LEO satellites are further adapted for:
 detecting the VHF signal from the aircraft;
 correcting for Doppler frequency shifts; and
 re-transmitting said VHF signal to the one or more control towers.

11. The system for air traffic control according to claim 6, wherein the one or more LEO satellites are further adapted for re-transmitting the signal from the one or more control towers to another LEO satellite in a position closer to the aircraft.

12. A low earth orbit, LEO, satellite for air traffic control, wherein human communication occurs between an air traffic controller in a control tower and a pilot of an aircraft, the LEO satellite being adapted for:
 a) receiving an Automatic Dependent Surveillance-Broadcast, ADS-B, signal from the aircraft;
 b) receiving and/or transmitting a signal from/to the control tower;
 c) receiving and/or transmitting a VHF signal from/to the aircraft;

wherein the ADS-B signal emitted by the aircraft comprises information regarding the aircraft's position, speed, and direction;

wherein the LEO satellite is further adapted for receiving the signal from the control tower, and to re-transmit said signal to the aircraft on a compensated VHF frequency for compensating for Doppler frequency shifts, and wherein the compensation is based on the information from the aircraft's ADS-B signal, and further wherein the signal received by the one or more LEO satellites from the one or more control towers and the signal re-transmitted from the one or more LEO satellites to the aircraft on the compensated VHF frequency includes human communication from the air traffic controller to the pilot, the human communication relating to maintaining or changing one or more of speed, altitude, heading, and separation, the use of the LEO satellite allowing the human communication between the air traffic controller and pilot before the aircraft would reach a sector where radio contact between the control tower and the pilot is available.

13. The LEO satellite for air traffic control according to claim 12, wherein the LEO satellite is further adapted for receiving the signal from the control tower, and to re-transmit said signal to the aircraft at a narrow transmission bandwidth of 8.33 kHz in one or more regions where aviation VHF channels are operated with nominally 25 kHz separation.

14. The LEO satellite for air traffic control according to claim 13, wherein the one or more regions are identified by the information from the aircraft's ADS-B signal.

15. The LEO satellite for air traffic control according to claim 14, wherein the LEO satellite is further adapted for re-transmitting the ADS-B signal and/or the VHF signal from the aircraft to another LEO satellite in a position closer to the control tower.

16. The LEO satellite for air traffic control according to claim 12, wherein the LEO satellite is further adapted for:
 detecting the VHF signal from the aircraft;
 correcting for Doppler frequency shifts; and
 re-transmitting said VHF signal to the control tower.

17. The LEO satellite for air traffic control according to claim 12, wherein the LEO satellite is further adapted for re-transmitting the signal from the control tower to another LEO satellite in a position closer to the aircraft.

* * * * *